US012233327B1

(12) United States Patent
Seth

(10) Patent No.: US 12,233,327 B1
(45) Date of Patent: Feb. 25, 2025

(54) SYSTEM AND METHOD FOR OFFICIATING INTERFERENCE IN SPORTS, POWERED BY ARTIFICIAL INTELLIGENCE

(71) Applicant: DIGIMITHRIL INC., Dover, DE (US)

(72) Inventor: Pragun Seth, Short Hills, NJ (US)

(73) Assignee: DIGIMITHRIL INC., Dover, DE (US)

( * ) Notice: Subject to any disclaimer, the term of this patent is extended or adjusted under 35 U.S.C. 154(b) by 0 days.

(21) Appl. No.: 18/808,886

(22) Filed: Aug. 19, 2024

Related U.S. Application Data

(60) Provisional application No. 63/663,382, filed on Jun. 24, 2024.

(51) Int. Cl.
G06K 9/00 (2022.01)
A63B 24/00 (2006.01)
A63B 71/06 (2006.01)
G06T 7/246 (2017.01)
G06V 10/25 (2022.01)
G06V 10/26 (2022.01)
G06V 10/764 (2022.01)
(Continued)

(52) U.S. Cl.
CPC ...... *A63B 71/0605* (2013.01); *A63B 24/0021* (2013.01); *G06T 7/248* (2017.01); *G06V 10/25* (2022.01); *G06V 10/26* (2022.01); *G06V 10/764* (2022.01); *G06V 10/82* (2022.01); *G06V 20/42* (2022.01); *A63B 2024/0025* (2013.01); *A63B 2024/0028* (2013.01); *A63B 2024/0034* (2013.01); *G06T 2207/10016* (2013.01); *G06T 2207/20081* (2013.01); *G06T 2207/20084* (2013.01); *G06T 2207/30224* (2013.01); *G06T 2207/30228* (2013.01)

(58) Field of Classification Search
CPC ............ A63B 71/0605; A63B 24/0021; A63B 2024/0025; A63B 2024/0028; A63B 2024/0034; G06T 7/248; G06T 2207/10016; G06T 2207/20081; G06T 2207/20084; G06T 2207/30224; G06T 2207/30228; G06V 10/25; G06V 10/26; G06V 10/764; G06V 10/82; G06V 20/42
USPC ......................................................... 382/103
See application file for complete search history.

(56) References Cited

PUBLICATIONS

Veedla, Walter Herold. "Automatic analysis of squash straight drives accuracy from a single camera view." (2023). (Year: 2023).*
(Continued)

*Primary Examiner* — Jonathan S Lee
(74) *Attorney, Agent, or Firm* — Nath, Goldberg & Meyer; Joshua B. Goldberg

(57) ABSTRACT

Embodiments herein disclose a system and method for officiating interference in sports, such as squash. The system utilizes bounding boxes to detect objects within images of a playing field, and tracks the change in the positioning of these objects. Using depth estimation, the system creates a three-dimensional representation of the playing field, and simulates a location of each object on the playing field. The system divides a front wall of the playing field into attacking sections and divides a floor of the playing field into segments. Based on the three-dimensional coordinates of the objects, a relevant attacking section and at least one relevant segment is obtained. The system calculates at least one metric metrics based on the objects' coordinates. The system utilizes an artificial intelligence model that renders a decision based on the calculated metrics, the relevant attacking section, the at least one relevant segment, and one or more rules.

28 Claims, 8 Drawing Sheets

(51) Int. Cl.
*G06V 10/82* (2022.01)
*G06V 20/40* (2022.01)

(56) References Cited

PUBLICATIONS

Brumann, Christopher, and Markus Kukuk. "Evolution based single camera resectioning based on distance maps of a known geometry for Squash sports." IEEE Access 10 (2022): 58136-58150. (Year: 2022).*

Singh, Prithvi Raj. Real-Time Object Detection and Tracking of Fast-Moving Small Objects Using RGB-D Camera and Computer Vision Techniques. University of Louisiana at Lafayette, 2023. (Year: 2023).*

Goh, Guo Liang, et al. "Automated service height fault detection using computer vision and machine learning for badminton matches." Sensors 23.24 (2023): 9759. (Year: 2023).*

Jhamb, Dhruv, and Ross Greer. "A Machine Vision Toolkit for Analyzing Tennis Racquet Positioning During Service." 2024 IEEE International Workshop on Sport, Technology and Research (STAR). IEEE, 2024. (Year: 2024).*

Murray, Stafford. Profiling elite male squash performance using a situation awareness approach enabled by automated tracking technology. Diss. Middlesex University, 2018. (Year: 2018).*

Ćirić, Ivan, et al. "Intelligent Computer Vision System for Score Detection in Basketball." Facta Universitatis, Series: Automatic Control and Robotics 22.2 (2024): 075-085. (Year: 2024).*

* cited by examiner

SYSTEM AND METHOD FOR OFFICIATING INTERFERENCE IN SPORTS, POWERED BY ARTIFICIAL INTELLIGENCE

CROSS-REFERENCE TO RELATED APPLICATIONS

This application claims the benefit of and priority to Indian Provisional Application 202411048293, filed on Jun. 24, 2024, and U.S. provisional application 63/663,382, filed on Jun. 24, 2024, which is hereby incorporated by reference in its entirety.

TECHNICAL FIELD

The present disclosure relates to the field of computer-vision powered by artificial intelligence for decision-making, and more particularly relates to a system and a method for officiating interference in sports powered by artificial intelligence.

BACKGROUND

Previously, the officiating in sports games (including squash) would occur without any technological intervention, where an on-field referee or an official would be solely responsible for making decisions during the sports game in real-time. Due to the unavoidable nature of human error, sometimes said referee would get key decisions wrong, thereby calling into question the fairness within the sport, the integrity or quality of the refereeing, and the outcome of the game.

To overcome the issues associated with human error, various sports (e.g., soccer and cricket), have now incorporated technology when it comes to such decision-making. The technology used in these sports utilize computer-vision techniques for object detection and object tracking. The technology usually acts as an assistant referee or enables a third referee to provide more information to the on-field referee, so that the on-field referee is able to make a better-informed decision. For instance, in soccer, a video assistant referee (VAR) has become an integral part of officiating sports games, where the on-field referee can consult with the VAR before finalizing his decision.

That being said, some sports, owing to their own unique requirements, have not been able to successfully incorporate the existing technology to aid the referee in his decision-making. An example of such a sports game is squash, where its fast pace and small dimensions of the court and ball make it difficult to utilize the available technology. Additionally, certain key decisions in squash, e.g., stroke, let, and no let, are dependent on determining the interference caused by a non-striker to the striker. Due to the subjectivity of different referees in evaluating a situation of interference, the same situation could have different outcomes based on their subjectivity. Presently, there is a lack of a technological solution for adjudicating the key decisions in squash based on interference.

SUMMARY

These and other problems are generally solved or circumvented, and technical advantages are generally achieved, by advantageous embodiments of the present disclosure.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the disclosure is directed towards a system. The system comprises an image capturing unit, configured to capture a plurality of input images, the plurality of images depicting a two-dimensional representation of a playing field. The system comprises an object detection module, configured to utilize computer vision techniques to detect a plurality of objects in the input images, the plurality of objects comprising at least two players and a ball, using bounding boxes. The system comprises an object tracking module, configured to utilize computer vision techniques to track a change in the position of the plurality of objects across at least one input image, among the plurality of input images. The system comprises a simulation module configured to simulate a location of each object, among the plurality of objects, on the playing field, by using depth estimation on the plurality of input images, to render a three-dimensional representation of the playing field. The simulation module is configured to identify x-axis, y-axis, and z-axis coordinates of the plurality of objects based on the depth estimation. The simulation module is configured to divide a front wall of the playing field into a plurality of attacking sections. The simulation module is configured to determine a relevant attacking section, among the plurality of attacking sections, based on the x-axis, y-axis, and z-axis coordinates of the ball. The simulation module is configured to divide a floor of the playing field into a plurality of segments. The simulation module is configured to determine at least one relevant segment, among the plurality of segments, based on the x-axis, y-axis, and z-axis coordinates of the at least two players and/or the ball. The system comprises a metric module, configured to calculate at least one metric based on the coordinates of one or more objects, among the plurality of objects across the at least one input image. The system comprises a decision-making module, employing at least one artificial intelligence model, configured to render a decision based on: the at least one metric; the relevant attacking section; the at least one relevant segment; and one or more rules correlating the decision to the at least one metric, the relevant attacking section, and the at least one relevant segment.

In another embodiment, the disclosure is directed towards a method. The method comprises capturing, by an image capturing unit, a plurality of input images, the plurality of images depicting a two-dimensional representation of a playing field. The method comprises detecting, by an object detection module utilizing computer vision techniques, a plurality of objects in the input images, the plurality of objects comprising at least two players and a ball, using bounding boxes. The method comprises tracking, by an object tracking module, configured to utilize computer vision techniques to track a change in the position of the plurality of objects across at least one input image, among the plurality of input images. The method comprises simulating, by a simulation module, a location of each object, among the plurality of objects, on the playing field, by using depth estimation on the plurality of input images, to render a three-dimensional representation of the playing field. The method comprises identifying, by the simulation module, the x-axis, y-axis, and z-axis coordinates of the plurality of objects based on the depth estimation. The method comprises dividing, by the simulation module, a front wall of the playing field into a plurality of attacking sections. The method comprises determining, by the simulation module, a relevant attacking section, among the plurality of attacking sections, based on the x-axis, y-axis, and z-axis coordinates of the ball. The method comprises dividing, by the simulation module, a floor of the playing field into a plurality of segments. The method comprises determining, by the simulation module, at least one relevant segment, among the plurality of segments, based on the x-axis, y-axis, and z-axis coordinates of the at least two players and/or the ball. The method comprises calculating, by a metric module, at least one metric based on the coordinates of one or more objects, among the plurality of objects across the at least one input image. The method comprises rendering, by a decision-making module employing at least one artificial intelligence model, a decision based on: the at least one metric; the relevant attacking section; the at least one relevant segment; and one or more rules correlating the decision to the at least one metric, the relevant attacking section, and the at least one relevant segment.

The details of the embodiments are set forth in the accompanying drawings and the description below. Other features, objects, and advantages of the disclosure will be apparent from the description and drawings, and from the claims.

BRIEF DESCRIPTION OF DRAWINGS

The detailed description is described with reference to the accompanying figures. The same numbers are used throughout the drawings to reference like features and components.

DETAILED DESCRIPTION

Figure 1:
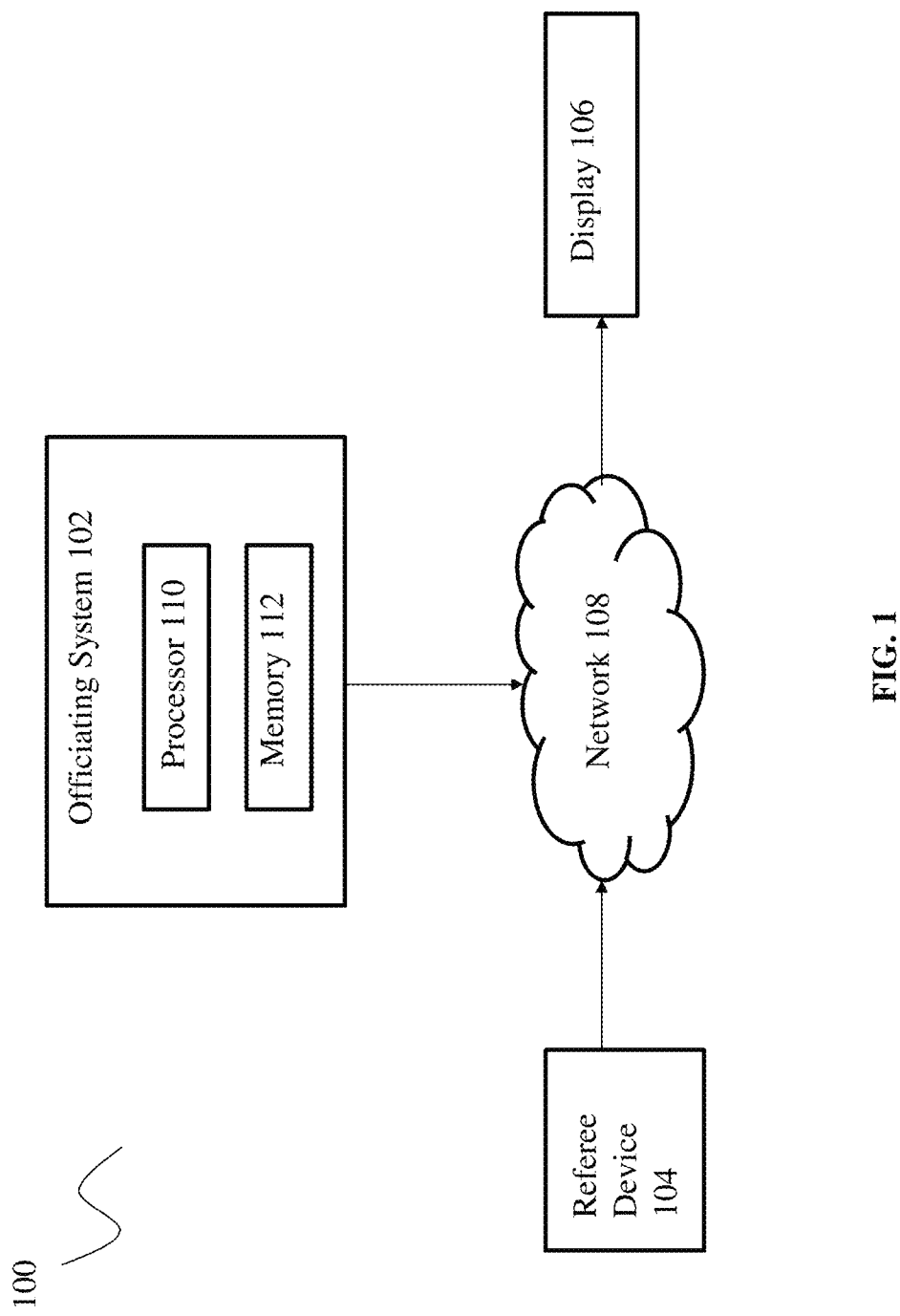
FIG. 1 illustrates an environment in which the officiating system interacts with a referee device and a display, according to an embodiment of the present disclosure.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements. The term "exemplary embodiment" is meant to be interpreted as being an example embodiment and is not meant to be interpreted as a preferred embodiment.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, whenever the phrase "at least one of" or "one or more of" precedes a list of elements, wherein the elements are joined by "and" or "or", it means that at least any one of the elements or at least all the elements are present. As used herein, whenever the phrase "one of" precedes a list of elements, wherein the elements are joined by "and" or "or", it means that only one of the elements are present at a given instant, unless the context permits a meaning that allows the inclusion of more than one element. The usage of the term "or" is to be understood as "inclusive or" instead of "exclusive or", unless indicated otherwise by the relevant context. Conditional language, such as among others, "can" or "may", unless specifically stated otherwise, or otherwise understood within the context as used, is generally intended to convey that certain embodiments could include, while other embodiments may not include certain features, elements, and/or steps. Thus, such conditional language is not generally intended to imply that features, elements, and/or steps are in any way required for one or more embodiments. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. In addition, all logical units described and depicted in the figures include the software and/or hardware components required for the unit to function. Further, each unit may comprise within itself one or more components, which are implicitly understood.

These components may be operatively coupled to each other and be configured to communicate with each other to perform the function of the said unit.

The embodiments herein utilize computer-vision techniques powered by artificial intelligence for decision-making. Using various computer-vision techniques, the positioning of the players and the ball in a playing field (e.g., a squash court) can be determined. Based on the computer-vision techniques, certain metrics and positional information of objects (e.g., players, squash racket, and ball) in the playing field are obtained that are representative of interference between a striker and a non-striker. For example, one metric that is obtained is the angle of the ball between the striker and non-striker, wherein the smaller the angle, the more will be the interference caused to the striker by the non-striker. The position of the players on the playing field floor are also representative of the level of interference caused to a striker, where the degree of interference can vary based on the players' position on the playing field floor. Similarly, where the ball has impacted on the front wall can also affect the level of interference. In squash, the key decisions, namely "stroke," "let," and "no let," are dependent on the interference caused by the non-striker. Other metrics that help in rendering a key decision can also be obtained, such as a striker's reachability, wherein if a striker is unable to reach the ball, the decision is likely to be "no let." An artificial intelligence-model (AI model), utilizing a rule engine that comprises a set of rules or criteria for each decision based on the metrics and the positional information of the objects (i.e., impact of ball on a front wall, landing of a ball on the court floor, and location of players on the court floor), is able to output a decision of "stroke," "let," or "no let." The decision from the AI model may stand independently or may be used to assist an on-field referee with rendering the final decision. In the case where the on-field referee has the final say, a percentage score may be allotted to the decision of the AI model, wherein a higher percentage score could indicate that the on-field referee can defer to the AI model, whereas a lower percentage score could indicate that the on-field referee should intervene.

One embodiment disclosed herein is an artificial intelligence-driven intelligent referee system (also referred to as "officiating system") that utilizes advanced artificial intelligence (AI) algorithms and state-of-the-art computer-vision techniques to autonomously evaluate gameplay in squash and make real-time decisions. The officiating system improves accuracy in tracking players and balls, significantly minimizing human errors and addressing the challenges of traditional officiating methods. By providing real-time decision suggestions, it enables human referees to make more informed judgments, ensuring a fair, precise, and efficient adjudication process. This officiating system uses advanced object detection and recognition techniques (i.e., computer-vision techniques) to monitor players, the ball, and court boundaries with remarkable precision. It adeptly handles the dynamic nature of squash by tracking these elements over time, ensuring accurate role recognition between the players as the game progresses. For example, in squash, the officiating system is able to assign a role of "striker" or "non-striker" to the players on a court. Furthermore, it simulates the location of the players and the ball on the court, incorporating depth tracking and three-dimensional (x,y,z) coordinate identification for all game elements. Through sophisticated algorithms, it achieves depth estimation using monocular images, enhancing the perception of spatial relationships within the game environment. The decision-making process is refined through the estimation of critical game factors, including the distances and angles between players and the ball, and their precise locations (i.e., positional information) on the court. These estimations allow for a nuanced understanding of spatial shifts over time, crucial for accurate officiating. The core of the system lies in its AI/ML-enabled decision model, which employs a rule engine (that includes the criteria for each decision) to categorize various decisions and actions in squash. For example, the officiating system can output a decision as "let," "no let," or "stroke," based on the comprehensive data analysis performed. In one embodiment, the officiating system can act as the sole decision-making entity for the sports game (e.g., squash), whereas in other embodiments, the officiating system can act as an assistant to the on-field referee.

Although example embodiments of the present disclosure will be explained in the context of squash being the sports game, it is to be noted that the scope of the embodiments are not limited to squash alone. The teachings of the embodiments disclosed herein are applicable to sports games such as tennis etc.

In squash, there are at least three decisions that impact the outcome of the game, namely (i) no let; (ii) let; and (iii) stroke.

A decision of "no let" is awarded when a first player (now non-striker), after hitting the ball, makes full way for the second player (now striker) to hit the ball, but the second player does not make an effort to reach the ball in order to hit it, or the ball is not within the second player's reach. For "no let", a point is awarded to the first player.

A decision of "let" is awarded when the first player, after hitting the ball, makes a good-faith attempt to make way for the second player to be able to hit the ball, but the first player still ends up interfering with the second player, which impedes the second player's effort in attempting to hit the ball. The ball should also be within the second player's reach. Neither player gets a point.

A decision of "stroke" is awarded when the first player, after hitting the ball, intentionally interferes with the second player's ability to hit the ball, thereby preventing the second player from hitting the ball. The ball should also be within the second player's reach. For "stoke", a point is awarded to the second player.

The above decisions are example decisions that are indicative of player interference in squash. By expressing the above decisions in mathematical terms and also making said decisions dependent on (i) the various objects' position on the squash court floor and (ii) the attacking section of the front wall, the embodiments herein are able to render a decision of "no let", "let", or "stroke" after a rally, and thereby officiate interference in squash. For the sake of consistent usage, the description herein will denote the "first player" as the "non-striker", and the "second player" as the "striker." However, it is to be noted that the label of "striker" and "non-striker" would actually alternate between the first player and the second player, and therefore contextual understanding would need to be applied to understand the role of the first player and the second player.

Referring now to the drawings, and more particularly to FIGS. 1 to 9, where similar reference characters denote corresponding features used consistently throughout the figures relating to the example embodiments disclosed herein.

Overview of the Officiating System

FIG. 1 illustrates an environment 100 in which the officiating system 102 can be deployed, according to an example embodiment. Along with the officiating system 102, the environment 100 can also include a referee device 104 and a display 106 (also referred to as "screen").

The environment 100 can include a squash court (or any other playing field, such as a tennis court), on which the players compete against each other. During a squash game, when the play is stopped due to, for example, a foul, or when the play (e.g., a rally) ends with some conflicting interpretations between the players (e.g., if a ball crossed a line), the on-field referee may be required to adjudicate the issue that gave rise to the stoppage/closure of the play. In order to adjudicate said stoppage/closure correctly (i.e., with more information and accuracy), the referee may consult with the officiating system 102 to help in rendering a decision. Accordingly, the referee may consult with the officiating system 102 via the referee device 104, wherein the referee device 104 can transmit a request to the officiating system 102 to analyze the stoppage/closure of the play, and to render a decision. In some embodiments, the decision output by the officiating system 102 may be the final decision. In some embodiments, the referee device 104 need not transmit a request to the officiating system 102 for the decision. Instead, the officiating system 102 may autonomously render its decision without requiring any prompt from the referee to render a decision.

The referee device 104 can be any device that is or incorporates a computer (e.g., a tablet or a smartphone). The computer can be an apparatus having one or more general or special purpose processors, memory, storage, and networking components (either wired or wireless). The apparatus may execute an operating system, and also have an interface over which the referee may transmit the request to the officiating system 102. It is to be noted that this description of the referee device 104 is not intended to limit its scope.

The referee device 104 may communicate with the officiating system 102 over a network 108. The network 108 can be the Internet, or a private communication link (e.g., LAN or WAN). The network 108 may use standard communication technologies or protocols.

By way of example, rather than limitation, the officiating system 102 can operate in the capacity of a server, or a client computer in a client-server network. The server may be a physical or virtual server, and the server may be a web server, an application server, or a cloud server.

The officiating system 102 includes at least one processor 110 and at least one memory 112.

By way of example, rather than limitation, the at least one processor 110 can include, for example, a microprocessor, a central processing unit, or the like. The at least one processor 110 can also include a special-purpose processor such as an application specific integrated circuit (ASIC), a field programmable gate array (FPGA), or the like. The at least one processor 110 is capable of executing a set of programming instructions/computer program code stored in the at least one memory 112 to result in the steps/actions performed by the various components within the officiating system 102.

By way of example, rather than limitation, the at least one memory 112 can include volatile memory (e.g., Random Access Memory (RAM)) and/or non-volatile memory (e.g., Read-Only Memory (ROM)). The at least one memory 112 stores the programming instructions/computer program code, that when executed by the at least one processor 110, result in the performance of the steps/actions described later herein. The various units and modules of the officiating system 102, which will be described later herein, can be implemented, at least, by the at least one processor 110 and the at least memory 112.

For the sake of simplicity, the disclosure below, and including the claims, attributes the functionality of the officiating system 102 to different modules, with each module performing a specific set of functions. However, this should not be considered as limiting the scope of the disclosure below, including the claims, as the function(s) performed by different modules are interchangeable.

The output of the officiating system 102, i.e., the decision rendered by the officiating system 102 can be displayed on the display 106. In an example embodiment, the display 106 can include a liquid crystal display (LCD) or a cathode ray tube (CRT). The display 106 can be a part of a standalone device, or a part of the referee device 104 or the officiating system 102.

In some embodiments, once the officiating system 102 has delivered a decision on a play, the referee may either accept or reject the decision, for example, via the interface on the referee device 104. A rejection of the decision by the referee can be sent as feedback to the officiating system so as to further reevaluate its parameters for rendering a decision.

In some embodiments, the officiating system 102 may continuously monitor the squash game in real-time so that a decision can be rendered without receiving a request from the referee. In other embodiments, the decision output by the officiating system 102 may be standing, where the referee cannot override the decision of the officiating system 102 (i.e., the decision of the officiating system 102 is final).

Description of the Components of the Officiating System

Figure 2:
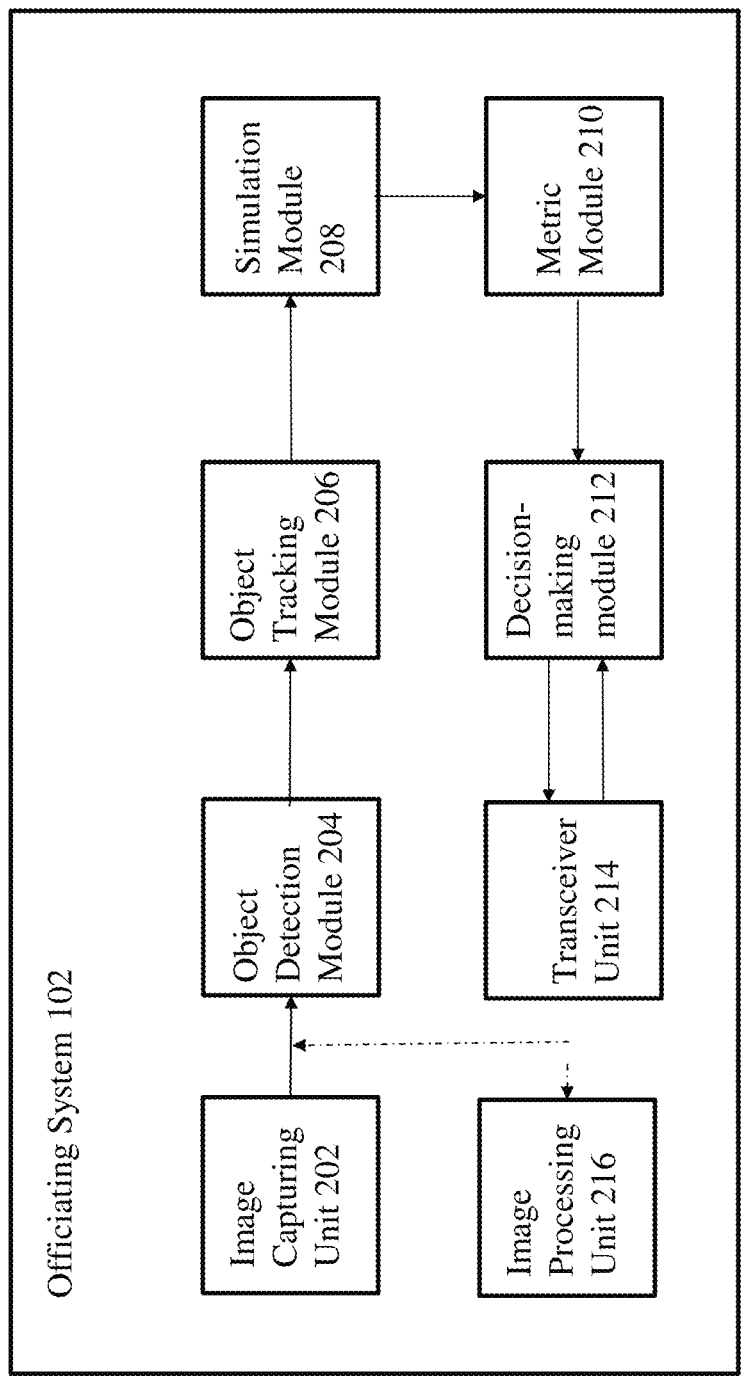
FIG. 2 illustrates the various components within the officiating system, according to an embodiment of the present disclosure.

FIG. 2 illustrates the various components within the officiating system 102, according to an example embodiment of the present disclosure. The officiating system 102 comprises: an image capturing unit 202, an object detection module 204, an object tracking module 206, a simulation module 208, a metric module 210, a decision-making module 212, a transceiver unit 214, and an image processing unit 216.

Figure 3:
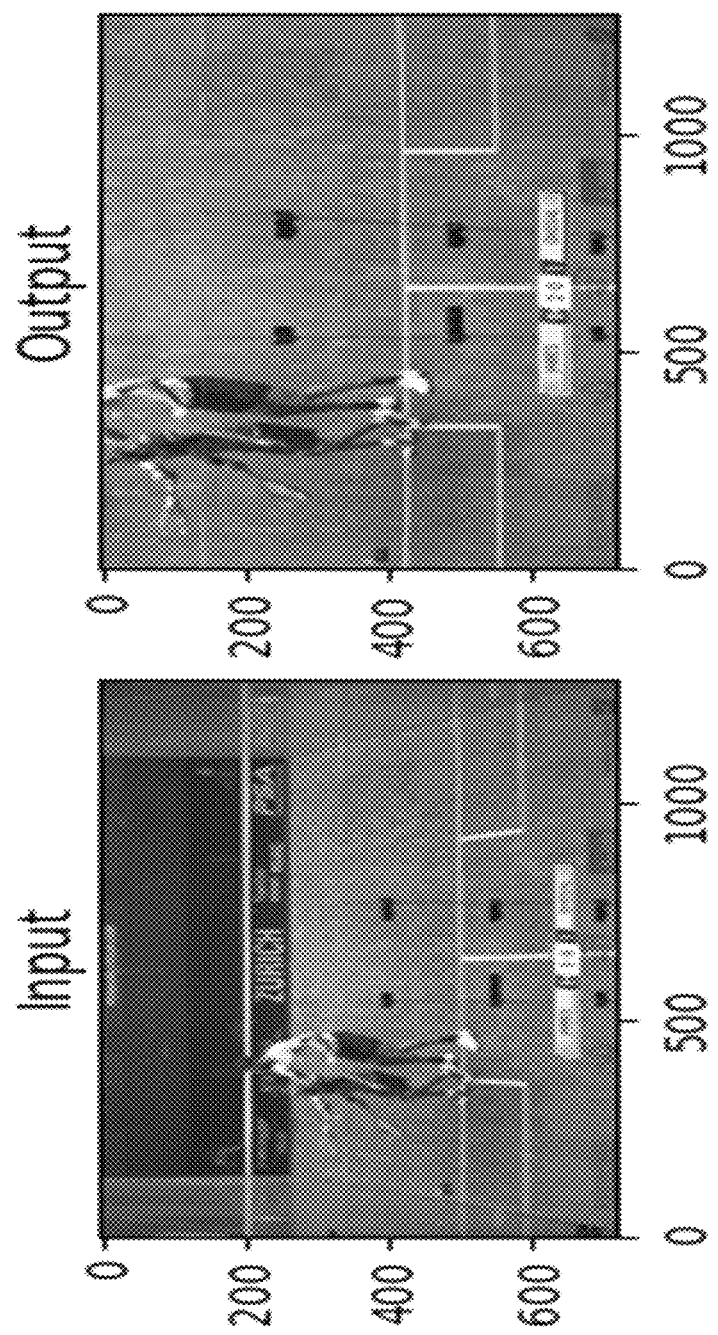
FIG. 3 illustrates a comparison between a captured image and a perspective transformation of the captured image, according to an embodiment of the present disclosure.

The image capturing unit 202 (e.g., a camera) can continuously capture frames of the playing field as the sports game is being played. The frames depict a two-dimensional representation of the playing field. The frames capture the movement of the players and the ball at different time instants. In some embodiments, where the captured image is a side-view image, the image processing unit 216 causes the captured image to undergo perspective transformation (to result in a top-down perspective image). In an example embodiment, the perspective transformation may be done using OpenCV's getPerspectiveTransform and warpPerspective functions. FIG. 3 illustrates a difference between the side-view image and the perspective-view image, wherein the left-hand side image (labelled as "Input") is the side-view image (i.e., captured frame), and the right-hand side image (labelled as "Output") is the perspective-view image. The perspective transformation helps in transforming, for example, the trapezoid squash court (in the captured frame on the left-hand side) to a rectangular shape, through which calculations of one or more metrics (e.g., distance between objects) can later be performed. The image processing unit 216 may calculate a horizontal scale and a vertical scale, which can be used as a scaling factor to transform pixel distances to actual distances in meters. The image processing unit 216 can calculate these scales using predefined actual dimensions of the squash court provided as variables. In an example embodiment, the image capturing unit 202 along with the transceiver unit 212, capture and stream a real-time video feed of the game. The image capturing unit 202 may efficiently sample frames at specific intervals, and package content into JPEG-formatted bytes, thereby facilitating comprehensive surveillance of the game.

The object detection module 204 receives as input the various captured (and processed) frames from the image capturing unit 202. The processed frames can include the captured frames that have undergone perspective transformation. As previously stated, the frames capture the various objects (e.g., players, squash rackets, and ball) on the squash court. The object detection module 204 can utilize various computer vision techniques (e.g., bounding boxes) for the object detection. In an example embodiment, the object detection module 204 may be implemented by a machine learning model, such as YOLOv8, configured to perform object detection. In such an embodiment, the object detection can occur by dividing the frames into a grid of cells, each cell responsible for detecting objects within its boundaries, and then predicting the bounding box coordinates, dimensions, and class probabilities for each object that is identified.

In another example embodiment, the object detection module 204 may be implemented by a convolution neural network (CNN) that extracts feature maps from the input images of the squash game. These features can capture important information such as edges, textures, and shapes. The CNN then generates region proposals that potentially contain objects. For example, R-CNN (region-based CNN) uses a Region Proposal Network (RPN) to propose candidate object regions. For each proposed region, the R-CNN predicts the bounding box coordinates (x, y, width, height) and classifies the object within the box. This can involve two tasks: i) bounding box regression and ii) classification. For the bounding box regression task, the coordinates of the proposed bounding box are adjusted to better fit the object. For the classification task, a class label is assigned to the object within the bounding box.

For training a machine learning model to perform object detection (i.e., an object detection model), the dataset utilized can comprise a plurality of images of a squash game, where each image is annotated with the necessary objects (e.g., players, squash rackets, and the ball). The images may be annotated by drawing bounding boxes around the objects, and labelling them with the appropriate class names. In an embodiment, the plurality of images used as part of the training dataset may also be resized for faster processing and reduced resource usage.

The output of the object detection model (or stated differently, the output of the object detection module 204) can include an image comprising bounding boxes with class labels and confidence scores, indicating the detected objects in the image.

In some embodiments, the object detection module 204 may be implemented by a plurality of object detection models, where one model performs player detection, and another model performs ball detection. The features of the player detection model can include processing the entire image in a single-pass, thereby quickly producing a result, and making it suitable for real-time applications. The player detection model can also be scalable, making it adaptable to different hardware capabilities, from mobile devices to high-end servers. An example of the player detection model is YOLOv8.

The ball detection model can be configured to analyze multiple consecutive frames, thereby enabling the ball detection model to determine the ball's position and trajectory. By determining the ball's position and trajectory, the tracking and recognition capabilities of the ball detection model are improved. The ball detection model can utilize a Gaussian heat map centered on the ball to accurately display its location. An example of the ball detection model is TrackNet.

Once the objects have been identified within a frame, among the plurality of captured frames, the object tracking module 206 can track the positioning of the objects in the successive frames so as to determine the change in the position of the objects as the game progresses (i.e., a spatial shift in each object is determined). In an example embodiment, the object tracking module 206 may be implemented using DeepSORT, which utilizes various object tracking algorithms for object tracking and/or other computer vision techniques.

Upon the detection and tracking of the objects (i.e., the players, squash racket, and the ball), the simulation module 208 simulates the location of the players, squash racket, and the ball on the squash court, incorporating depth tracking and three-dimensional (x,y,z) coordinate identification for the objects. In other words, the simulation module 208 obtains/renders a three-dimensional (3D) reconstruction of the two-dimensional (2D) perspective view image (i.e., the captured (and transformed) frame) using depth estimation. This way, the simulation module 208, with the help of the object detection module 204 and object tracking module 206, is able to determine the 3D x-axis, y-axis, and z-axis coordinates of the objects on the squash court.

The simulation module 208 may also help in (i) dividing the front wall of the squash court into a plurality of attacking sections and (ii) dividing the squash court floor into a plurality of segments.

Division of Front Wall into Attacking Sections

Figure 8:
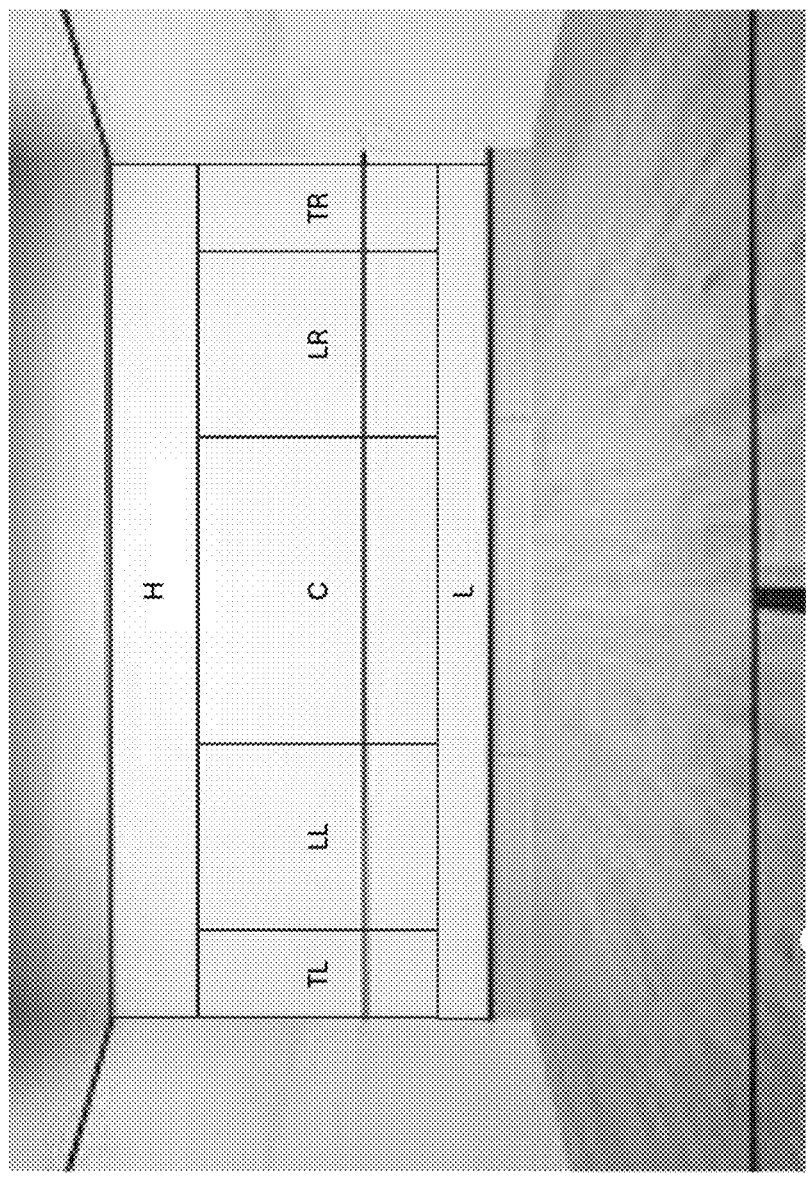
FIG. 8 illustrates a view of the squash court's front wall being divided into a plurality of attacking sections, according to an embodiment of the present disclosure.

In an example embodiment, as shown in FIG. 8, the front wall can be divided into seven attacking sections. The following table illustrates the mapping of an abbreviation to an attacking section.

| Abbreviation | Attacking Section |
| --- | --- |
| H | High |
| TL | Tight Left |
| LL | Loose Left |
| C | Center |
| LR | Loose Right |
| TR | Tight Right |
| L | Low |

Attacking section H: This area is usually targeted for lobs or high drives to push the non-striker back. Shots made toward this area also act as a defensive shot when under pressure.

Attacking section TL/TR: These areas are ideal for playing shots that stick close to the sidewalls, where a first player having a made a shot towards the TL and TR attacking section, makes it difficult for the second player to make a return shot (also referred as "to return").

Attacking section LL/LR: Hitting these areas usually indicates less control, as the ball is away from the sidewall, therefore, as a result of the first player making a shot towards the LL/LR attacking section, the second player would find it easier to return.

Attacking section C: This area is generally targeted for cross-courts to maintain a neutral game (i.e., by moving your opponent around the court) or set up for a stronger shot.

Attacking section L: This section is typically used for "kill shots" or drops that aim to put pressure on the opponent and set up opportunities to end the rally by keeping the ball close to the tin. It can also be utilized for boasts (i.e., a defensive shot by a striker that pushes the non-striker to the front of the court).

Depending on which attacking section of the front wall is impacted by the ball (as a result of the first player's shot), it can affect the interference decision that would follow thereafter.

Examples of Scenarios where the Ball's Impact on an Attacking Section of the Front Wall Affects the Interference Decision In a first example, if it is detected that the second player hits a low shot to the TL attacking section (the detection can be based on the coordinates of the ball), and the first player is struck by the ball on its direct path to the front wall (the striking of the first player by the ball can be detected by a change in the ball's trajectory over a plurality of frames) while the first player made little to no effort to clear, then the decision is likely to be a "stroke."

In a second example, if the first player hits to the LL attacking section, and the first player is slightly in the way but not blocking a direct shot or a reasonable follow-through for the second player, and there is still room to play the ball, the decision is likely to be a "let."

Essentially, all the ball bounces are first detected, and then those bounces which occur on the front wall are filtered out. These bounces can be classified based on the attacking section of the front wall it bounced from. Stated differently, these bounces can be classified based on the attacking section of the front wall that the ball impacts. A ball that impacts a tight section (TL/TR) of the front wall, may make it harder for a striker to hit a good return. A ball that impacts a loose section (LL/LR) of the front wall, can make it easier for the striker to strike it, and more likely that there will be physical interference.

Division of Court Floor into Segments

Figure 9:
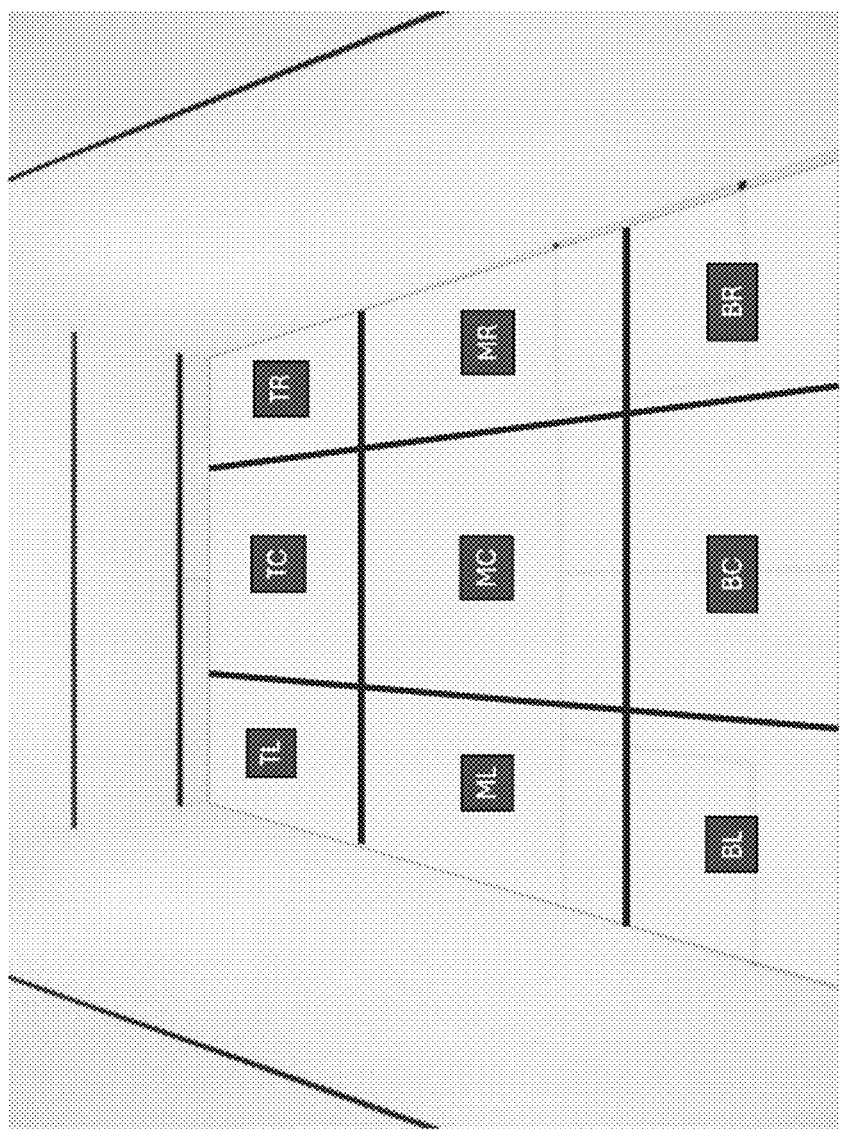
FIG. 9 illustrates a view of the squash court floor divided into a plurality of segments, according to an embodiment of the present disclosure.

In an example embodiment, as shown in FIG. 9, the squash court floor can be divided into 9 segments. Each segment may result in decisions that are not standardized across the entire court. For example, a "stroke" in the "Top Left" segment would be dissimilar to a "stroke" in the "Middle Right" segment of the squash court floor. The following table illustrates a mapping of an abbreviation to a segment of the squash court floor.

| Abbreviation | Segment Of The Squash Court Floor |
| --- | --- |
| TL | Top Left |
| TC | Top Center |
| TR | Top Right |
| ML | Middle Left |
| MC | Middle Center |
| MR | Middle Right |
| BL | Back Left |
| BC | Back Center |
| BR | Back Right |

Top Segments (TL/TC/TR): These segments are typically where high shots and lobs are played from. Interference here might often involve blocking a player's ability to move back into position after a deep shot.

Middle Segments (ML/MC/MR): These segments are central to most rallies, and they see a variety of shots. The decisions here are crucial as they often involve direct paths to the ball.

Back Segments (BL/BC/BR): These segments are where balls commonly hit deep into the corner's land. Shots in these segments often result in right plays and potential interference near the back wall.

Each segment can have predefined criteria based on typical plays and scenarios observed in that area, which can guide more consistent and nuanced decision-making.

In an example embodiment comprising 9 segments, the court floor can also be divided into 3 sections: front court, mid court, and back court. The front court can comprise the TR, TC, and TL segments. The mid court can comprise the MR, MC, and ML segments. The back court can comprise the BR, BC, and BL segments.

In the front court, the attacking section often involves drop shots or tight low shots. In the mid court, the attacking section focuses on volleys and dominating the middle center. In the back court, the attacking section involves drives, cross-court, and boasts which are commonly played and a way to keep both the striker and non-striker at the back of the court.

Example Scenarios of how the Court Floor Section Results in a "No Let"

In a first example, if the interference happens in the front court, specifically in the TR or TL segment, and the second player had no reasonable chance to reach the ball (based on the second player's reachability), then the decision is likely to be "no let."

In a second example, if the interference happens in the mid court where the first player attempts a volley drive to the back of the court, a "no let" can be given because the ball is located in the back court, and there is no interference preventing the second player from retrieving the ball.

In a third example, if the interference happens in the back court, where the first player players a tight drive and the ball lands in the BR segment, a "no let" can be given because the ball is tight to the corner.

Example Scenarios of how the Attacking Section of the Front Wall & the Court Floor Segment Results in a "No Let"

In a first example, assume that the first player plays a drive from the MR court floor segment, thereby hitting the front wall in the TR attacking section, and the ball travels down to the BR court floor segment. The second player attempts to intercept the ball from the ML court floor segment, and passing through the MC court floor segment, but there is an interference where the first player moves back to the MC court floor segment after playing their shot. In this case, a decision of "no let" can be awarded because, owing to combination of the shot depth and the speed of the ball into the BR court floor segment, the second player would not have been able to reach the ball.

In a second example, assume that the first player plays a short attacking shot from a location between the MR and MC segments, leading to the ball impacting the attacking front wall section TR, and then landing on the MR segment. Assume also that the second player is located at the MC segment and tries to retrieve the ball, and that the first player moves back from the MR segment, laterally towards the MC segment, unintentionally in the direct path of the second player. Nonetheless, a decision of "no let" can be awarded because of the type of shot (impacting the TR front wall attacking section and landing in the MR court floor segment) from the first player, which resulted in the ball being out of the second player's reach.

In a third example, assume that the first player plays a loose shot on the LL front wall attacking section, leading to the ball landing at the BC court floor segment. The first player then clears to the BR court floor segment, while the second player is positioned at the BC court floor segment. This can lead to a decision of "no let" as the first player has cleared the area for the second player to play the shot.

Example Scenarios of how the Court Floor Section Results in a Decision of "Let"

In a first example, assume that the first player has played a drop shot and the ball lands in the TR court floor segment (i.e., in the front court section). Then a decision of "let" can be awarded because the second player, when moving in to play the ball, is interfered with by the first player moving out to give space, preventing the second player from having access to the ball.

In a second example, if the first player attempts a volley drive and the ball bounces in the MR court floor segment (i.e., in the mid court section), and is still playable for the second player, a decision of "let" can be awarded. This is because the second player, moving towards the ball, is interfered with by the first player's position while stepping out, preventing a direct line of access to the ball.

In a third example, if the interference happens in the back court, where the first player plays a right drive and the ball lands in the BR court floor segment and is still playable, a decision of "let" can be awarded. This is because the second player, when moving in to play the shot, is interfered by the first player's movement in clearing out, preventing the second player from retrieving the ball.

Example Scenarios of how the Attacking Section of the Front Wall & the Court Floor Segment Results in a Decision of "Let"

In a first example, assume that the first player plays a drop shot that runs close along the LL front wall attacking section and lands in the TL court floor segment. The second player, who is positioned centrally at the MC court floor segment, moves forward diagonally towards the ball for a TL pickup, but finds their path blocked by the first player (who is clearing the front area and moving back to the MC court floor segment after the shot). Here, a decision of "let" may be awarded because the second player's frontal movement is interfered with by the first player's movement when clearing. The second player is able to reach the ball, but a fair attempt at playing the ball on the TL court floor segment is prevented.

In a second example, assume that the first player plays a short drive that hits the TR front wall attacking section and bounces at the lower end of the MR court floor segment. The first player then moves back to the MC court floor segment. The second player, who is coming from the middle left is attempting to intercept and play the ball, but the first player unintentionally blocks the lateral path of the second player's movement and space. A decision of "let" may be awarded because the second player's lateral movement to reach a loose bounce ball is interfered with by the first player's position in the MC court floor segment, and the distance between the ball and the second player is lesser than a threshold number (of pixels).

In a third example, the first player plays a cross-court shot from the BR court floor segment to the center front wall attacking section, where the ball lands towards the BC court floor segment. The first player then moves back to the MC court floor segment. The second player attempts to play the ball, but is interfered with by the first player's position at the MC court floor segment. A decision of "let" may be awarded as the second player is able to play the ball but does not have a clear view to play the ball to the front wall.

Example Scenarios of how the Court Floor Section Results in a "Stroke"

In a first example, if the interference happens in the front court where the first player plays a drop shot that lands in the front right and fails to move out, giving minimal space for the second player to move in, a "stroke" may be awarded. The interference prevents the second player from moving in and having a clear line to play the shot.

In a second example, if the interference happens in the mid court, where the first player attempts a volley and the ball returns directly to the first player, preventing the first player from moving out before the second player attempts to play the shot, a "stroke" may be awarded. The interference blocks the second player's direct line to the ball, leaving no room for play.

In a third example, if the interference happens in the back court, where the first player plays a drive and the ball lands between the BC and BR court floor segments, while failing to clear in time, a "stroke" may be awarded. The interference to the second player prevents the second player from having room to play the shot.

Example Scenarios of how the Attacking Section of the Front Wall & the Court Floor Segment Results in a Decision of "Stroke"

In a first example, assume that the first player plays a drop shot onto the L front wall section on the right side and the ball lands on the TR court floor segment. The second player moves in with a frontal approach to play the ball, but the first player is directly in front of the ball. A "stroke" may be awarded because the distance between each player and the ball is below a threshold, which also prevents the second player from playing the ball without the risk of hitting the first player.

In a second example, assume that the first player plays the ball onto the LR attacking front wall section and the ball lands in the MC court floor segment. Also assume that the second player, who is positioned in the MC court floor segment, is moving laterally towards the ball, but the first player did not clear out and the ball is coming back towards the first player. In this case, the decision awarded can be a "stroke" because there is no room for the second player to play the ball safely, and the distance between the second player and the ball is also below a threshold.

In a third example, assume that the first player plays a straight drive from the BL court floor segment to the H front wall attacking section, and that the ball lands between the BL and BC court floor segment. The second player attempts to play the shot, but the first player blocks the path to the ball without giving enough space for player B to play the shot. A decision of "stroke" can be awarded, because the first player did not make adequate effort to move away from the ball and interfered in the second player's swing to hit the ball. The determination of whether the first player made an adequate effort to move away from the ball can be determined based on the speed and distance travelled by the first player over a series of frames (explained later herein). If the first player moves slowly or covers a minimal distance (based on a threshold), this can be interpreted as a lack of effort. By establishing an objective criteria for lack of effort, the subjectivity employed by referees for determining a lack of effort is eliminated, which results in improved accuracy.

As previously stated, the simulation module 208 generates the x-axis, y-axis, and z-axis coordinates of the players' position, the squash racket head position, and the ball's position on the squash court floor. These coordinates are indicative of the relevant attacking section of the wall (i.e., ball-impacted area of the front wall), and the relevant segment(s) of the squash court floor (i.e., the segment(s) where the players are located at the time of interference, the segment where interference has occurred, and/or the segment where the ball is located).

Based on the determined x-axis, y-axis, and z-axis coordinates, the metric module 210 can calculate at least one metric that is relevant towards a decision to be output by the decision-making module. The relevancy of the metric towards a decision can be based on whether the metric satisfies a mathematical criteria for the decision. Details of the various metrics measured by the metric module 210 will now be explained.

Distance between objects: The metric module 210 can utilize the Euclidean distance formula to calculate the straight-line distance between two points (e.g., the distance between each player, or a distance between a player and a ball). For example, the distance between two points $(x_1, y_1)$ and $(x_2, y_2)$ can be calculated as:

$$d = \sqrt{(x_2-x_1)^2 + (y_2-y_1)^2} \quad \text{(eq 1)}$$

In some embodiments, the metric module 210 also calculates the Euclidean distance between a player and the ball's second bounce, wherein the second bounce may be identified using video analysis. This distance can be used for calculating if the ball is out of a striker's reach. The ball's second bounce can be used to estimate the striking point of the ball. The striking point is usually at the midpoint of the first bounce and the second bounce. The striking point can help in determining if there is any obstruction in the path of the striker to the ball. The metric module 210 can also calculate the shortest distance between a player and the ball's trajectory after the second bounce. This can be determined by calculating the perpendicular distance from the player to a line representing the ball's trajectory. In case the distance between two players is to be calculated, the coordinates $(x_1, y_1)$ and $(x_2, y_2)$ can represent the coordinates for the closest ankles of each player. The spatial shift of a player, across a plurality of captured images, can also be determined based on the change in the coordinates of the player, and can be calculated using the Euclidean distance formula.

Figure 5:
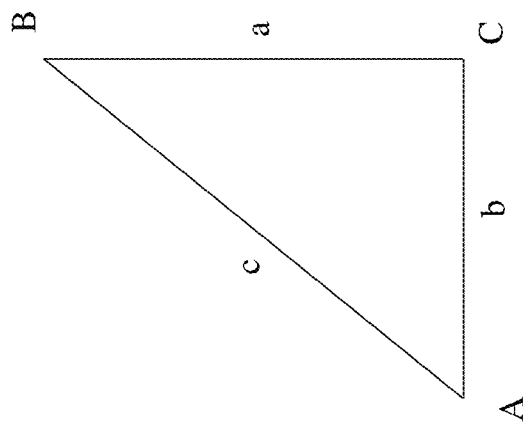
FIG. 5 illustrates the manner in which a distance between two objects is calculated, according to an embodiment of the present disclosure.

With reference to FIG. 5, a distance 'c' between the objects (at points 'A' and 'B') can be calculated by considering the scaling factors applied by the image processing unit 216, as follows:

$$c = \sqrt{(a^2)*\text{verticalScale} + (b^2)*\text{horizontalScale}} \quad \text{(eq. 2)}$$

Figure 4:
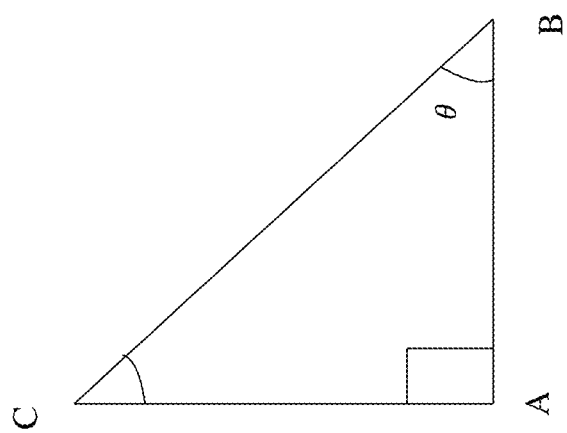
FIG. 4 illustrates the manner in which the angle between objects is calculated, according to an embodiment of the present disclosure.
Figure 6:
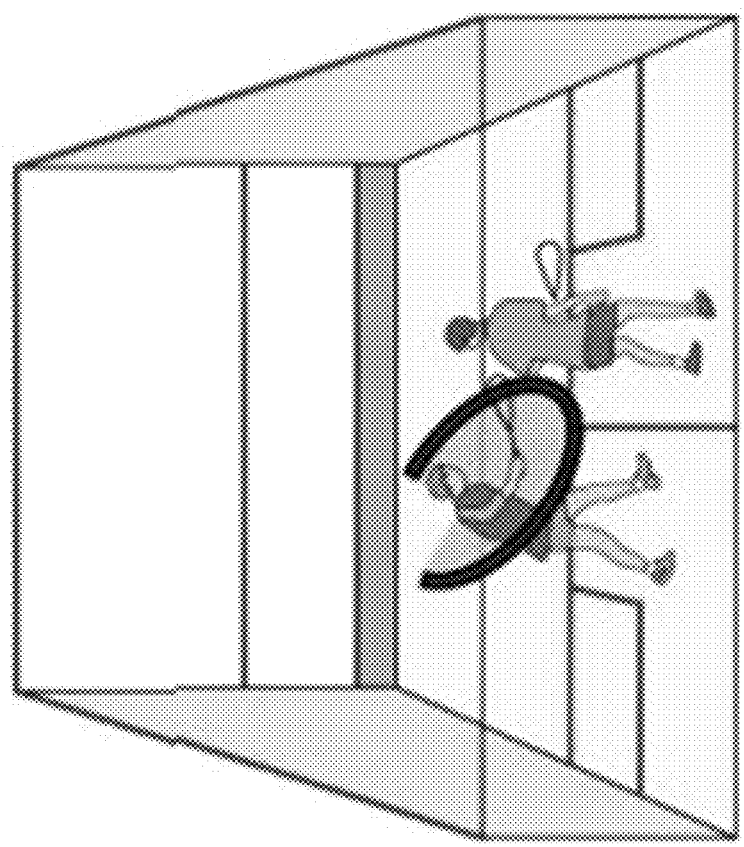
FIG. 6 illustrates a scenario with interference for a striker due to the distance between the striker and the non-striker, according to an embodiment of the present disclosure.

Angle of ball between objects: With reference to FIG. 4, by using the law of cosines, the angle between three points can be determined. The calculation of this angle can help in determining the orientation or movement direction of an object. Given three points A, B, C, the angle θ can be calculated using the following formula:

$$\theta = \arccos\left(\frac{BA^2 + BC^2 - AC^2}{2 \cdot BA \cdot BC}\right) \quad \text{(eq. 3)}$$

Player's Reach & Reachability: A player's reach ("r") relates to the maximum distance that can be covered by the player to hit the ball. The reach can be calculated by considering the player's arm length, racket length, as well as their ability to stretch and move. The reach is also influenced by physical characteristics of the player, such as their height, agility etc. It is to be noted that a player's reach is distinct from their reachability (i.e., ability to reach the ball during a rally), wherein the player's reachability is based on the player's reach, their speed, and the distance between the player and the ball.

For example, for a player having a height of 180 cm, an arm length of 70 cm (for instance, approximately 39% of the height), a racket length of 68.6 cm (standard size of squash racket), and a semi-circular swing arc, the player's reach can be calculated as a sum of the player's arm length and the racket length. The swing arc radius is 140 cm (equal to the player's reach).

As previously stated, the player's reachability is indicative of whether the player can reach the ball. In one embodiment, this can be based on the distance between the racket head and the ball position. For instance, in order to get to a ball, a player might be fully extended, with the racket head reaching out significantly farther than his body, allowing the player to hit a ball that is one and a half meters away. The distance between the racket head and the ball position can be calculated using the Euclidean distance formula as per eq.1, using the coordinates of the racket head and the ball. In embodiments of the disclosure that are applicable to other sports, the distance between the head of a playing tool (e.g., a tennis racket) and the ball can be calculated.

Clear view of front wall: The metric module 210 determines whether the striker has a clear view of the front wall. In case the striker does not have a clear view (i.e., proper line of vision) of the front wall, it would indicate that there is interference to the striker. The metric module 210 may generate a value of 0 to 1, to indicate the probability of interference to the striker based on the amount of front wall blockage. The front wall blockage can be calculated by (i) drawing a first set of imaginary lines from the second player to both sides of the first player, where the first set of imaginary lines would meet the front wall. Then, (ii) a second set of imaginary lines were drawn from the ball, where the second set of imaginary lines passed the first set of imaginary lines. The width of the area covered by the second set of imaginary lines can represent the amount of front wall blockage.

Speed of the objects: The speed of an object can be calculated by tracking the movement of the objects over time across the plurality of captured frames. For example, assuming that an object moves from the coordinates (100, 150) to (200, 300) in 0.5 seconds, the speed can be calculated using the below formula. The distance 'd' can be calculated using the Euclidean distance formula.

$$\text{speed} = \frac{d}{\text{time}} = \frac{\sqrt{(200-100)^2 + (300-150)^2}}{0.5} \quad \text{(eq. 4)}$$

It is to be noted that the aforementioned metrics include a non-exhaustive list of metrics that can be calculated by the metric module 210.

The metric module 210 can work in conjunction with the decision-making module 212 for rendering a decision. The decision-making module 212, which can include at least one machine learning model, is configured to render the decision on the game based on the following factors: (i) a mathematical representation of the decision using the aforementioned one or more metrics; (ii) the determined attacking section of the front wall (i.e., where the ball impacts the front wall); and (iii) at least one relevant segment of the squash court floor (e.g., the players' location on the squash court floor and the ball's position on the squash court floor). In some embodiments, the ball's position on the squash court floor can be between two segments (e.g., the BC and BR segments), i.e., the ball's position on the squash floor can be represented by two relevant segments, namely BC and BR. In other words, each interference-based decision in squash can be represented in a manner in which the above-mentioned factors satisfy a criteria.

In the context of squash, the aforementioned factors may be determinative of one or more situational characteristics associated with a player. In one example, using the metric relating to the angle between the ball and the players, a situational characteristic of an unobstructed direct line of access to the ball can be determined. Referring to FIG. 4, when the ball is located at point 'B', with the non-striker located at point 'A', and the striker located at point 'C', the lower the angle θ between the striker and the non-striker, the greater would be the obstruction to the striker's direct line access to the ball.

In another example, based on the metric relating to the distance between the players, a situational characteristic relating to the space for the striker to play the shot can be determined. For instance, with reference to FIG. 6, the lower the distance between the striker and the non-striker, the greater would be the obstruction to the striker to swing the racket.

The decisions for "no let", "let", and "stroke" can be represented as the following criteria/rules (collectively known as "rule engine"). It is to be noted that the below criteria is intended to be non-limiting and can vary across different embodiments.

No Let Criteria: The non-exhaustive criteria for resulting in a decision of "no let" can be as follows:
- The distance between the ball and the striker is greater than a threshold number of pixels, wherein the number of pixels and the distance can be represented in meters.
  - The distance can be determined by calculating the Euclidean distance (as shown in eq. 1) between the striker and the ball, and applying the scaling factors to said calculation.
  - The threshold number of pixels may be determined by the machine learning model (employed by the decision-making module 212), after the model has been trained.
- The distance between each player is lesser than a threshold distance (e.g., 1 meter).
  - This also can be determined using the Euclidean distance formula (as shown in eq. 1).
- The ball is out of the reach of the player.
  - This can be determined by comparing the (i) distance between the striker and the ball (d1), (ii) the distance travelled by the striker towards the ball after the first bounce (d2), (iii) the striker's reach (r), wherein if d1>(d2+r), the ball is out of the reach of the striker.

This can also be determined by calculating the distance between the striker's racket head and the ball.
- The attacking section of the front wall & court floor segment(s) is as per the example scenarios mentioned above.

Let Criteria: The non-exhaustive criteria for resulting in a decision of "let" is as follows:
- The distance between the players is lesser than a threshold (e.g., 0.5 meters).
- The angle of the ball is lesser than a threshold (e.g., 5°), in one or more previous frames.
- The frontal interference or lateral interference is high in one or more frames.
  - The frontal interference can be determined on the basis of the closeness of the non-striker to the striker, wherein the closer the non-striker is to the striker, the higher will be the interference. The non-striker can be said to be close to the striker if (i) the 'y' coordinate of the non-striker lies in between the 'y' coordinate of the striker and the ball; and (ii) the 'y' coordinate of the non-striker and the ball is lesser than the 'y' coordinate of the striker (depending on the angle of the camera).
- The striker is able to reach the ball.
  - This is determined when d1 (d2+r)
- Distance between the ball and the striker is lesser than a threshold number of pixels.
- The striker does not have a clear view of the front wall.
- Amount of overlap of bounding box for each player is less than a threshold (e.g., 50%) in one or more previous frames.
  - The bounding box can be provided by the object detection module 204.
- The attacking section of the front wall & court floor segment(s) is as per the example scenarios mentioned above.

Stroke Criteria: The non-exhaustive criteria for resulting in a decision of "stroke" is as follows:
- Distance between the ball and the striker is lesser than a threshold number of pixels (e.g., 100 pixels).
- Distance between players is lesser than a threshold distance (e.g., 0.5 m).
- The striker is able to reach the ball.
- Angle of the ball is close to zero (e.g., between 0° to 10°) in one or more previous frames.
- Amount of overlap of bounding box is greater than a threshold (e.g., 60%).
- The attacking section of the front wall & court floor segment(s) is as per the example scenarios mentioned above.

The aforementioned factors (i.e., the metrics, the attacking section, and the squash court floor segment) are fed as input to the decision-making module 212. The decision-making module 212 can be implemented by at least one machine learning model.

Training of the Machine Learning Model

In the context of squash, in order to train the at least one machine learning model to render a decision of "no let", "let", and "stroke", the machine learning model may be trained using a library of video clips that are labelled as "stroke", "let", and "no let." These video clips may form a part of the training and validation set. The training-validation set may follow a 70:30 or 80:20 split.

Machine learning models may suffer from different biases, which can result due to shortcomings in the training of the machine learning model. For example, one source of bias can be the type of training dataset for the machine learning model. As such, the training set/data here can additionally include information of the front wall section that is impacted by the ball. Further, in an embodiment, the training dataset can also be divided into N datasets, where N represents the total number of segments of the court floor. In other words, each dataset, among the N datasets, can correspond to a specific segment of the court floor on which the interference occurs. The machine learning model can be trained on these N datasets, where the machine learning model can learn from the N dataset as to how the decision of "let," "no let," and "stroke," would vary from segment to segment. By training the machine learning model to consider more input data, i.e., by considering the attacking section of the front wall and the court floor segment, there is a reduction in the bias of the output of the machine learning model. It is to be noted that the embodiments herein may also achieve other technical effects and advantages in addition to what is disclosed herein.

In one example embodiment, the decision-making module 212 may be implemented by three binary classifiers. Each classifier is trained to distinguish a single class vs other classes. For instance, in a 3-class problem (let, no let, stroke), the three binary classifiers would work in the following manner:
 a. Binary Classifier 1: Class "Stroke" vs. "Not Stroke"
 b. Binary Classifier 2: Class "Let" vs "Not Let"
 c. Binary Classifier 3: Class "No Let" vs "Not No Let"

Each binary classifier can be trained independently. For each classifier the positive class is the target class and the negative class includes all other classes. For example, if the positive class is "stroke", then the negative class is "let" and "no let". During prediction, all classifiers output a probability or a score indicating the likelihood that the input (metrics, attacking section, and squash court floor segment) belongs to a respective class. The class with the highest score can be chosen as the decision of the decision-making module 212.

In a second example embodiment, the decision-making module 212 may be implemented by a single multi-class classification model. This model is designed to classify input data into one of several classes, and can be utilized in situations where the input can belong to only a single class among the several classes. Some algorithms that can be utilized for multi-class classification include decision trees, random forests, and multinomial logistic regression. The model can be trained directly on the multi-class dataset, using a loss function that considers all classes (e.g., cross-entropy loss). During prediction, the model outputs probabilities for each class, where the class with the highest probability is chosen as the decision of the decision-making module 212.

In a third example embodiment, the decision-making module 212 may be implemented by a neural network that can handle multi-class classification by using a softmax activation function in the output layer. The neural network outputs a probability distribution over all classes. The neural network can be trained using backpropagation with a loss function such as categorical cross-entropy, which measures the difference between the predicted and actual class probabilities. During prediction, the class with the highest probability is chosen as the decision of the decision-making module 212.

The decision from the decision-making module 212 (or the machine learning model) can be the final interference-based decision, based on which it is determined which player to award a point to or whether neither player is awarded a point.

Figure 7:
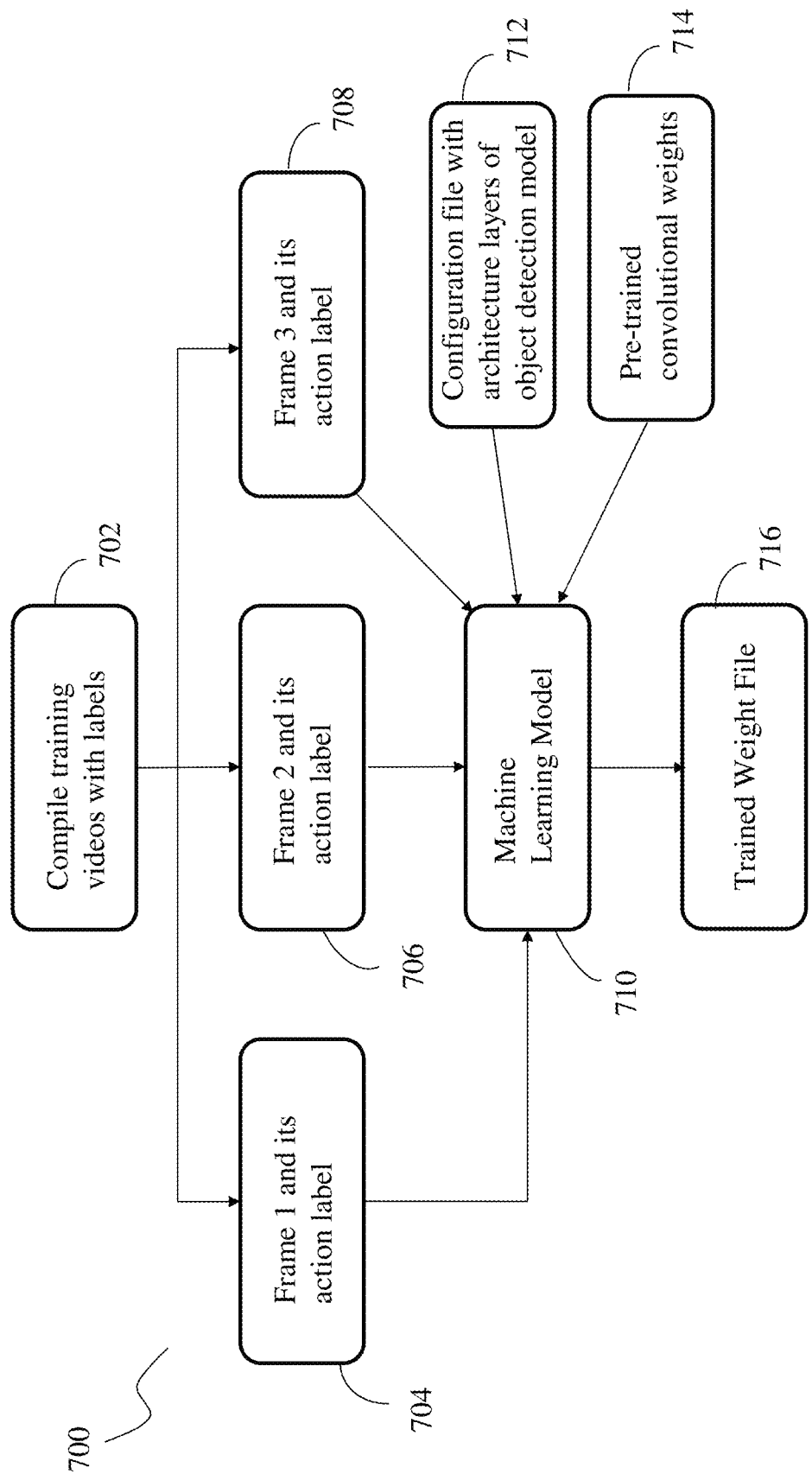
FIG. 7 illustrates a training flowchart for the machine learning model that outputs an interference-based decision of squash, according to an embodiment of the present disclosure.

FIG. 7 illustrates a training flowchart 700 of the at least one machine learning model (as part of the decision-making module 212), according to an example embodiment disclosed herein. At step 702, a set of training videos with labels are compiled, which are to be fed as part of the training set for the at least one machine learning model. The labels include "no let", "let", and "stroke." The training data set may be stored in XML format.

In some embodiments, as part of the training data pre-processing, (i) the frames may also be resized so that they are of consistent size, (ii) the pixel values may be normalized, and (iii) the frames may undergo data augmentation (e.g., image rotation or flipping). As a result of this preprocessing of the images, there is faster processing and reduced resource usage by the at least one machine learning model.

At steps 704, 706, and 708, individual frames (with the labels) are received and input, at step 710, to the at least one machine learning model. The label for each individual frame may be provided in TXT format. At step 712, the at least one machine learning model also receives the configuration file with the architecture layers of the object detection model (e.g., YOLOv8), and at step 714, receives the pre-trained convolutional weights of the object detection model. In other words, the object detection performed can help in creating the features and variables that are fed to the machine learning model as the training data. At step 716, a trained weight file of the machine learning model is obtained.

It is to be noted that in some embodiments, the training flowchart 700 can comprise additional steps or even omit the steps as mentioned in FIG. 7.

Once the at least one machine learning model has been trained, it can render a decision on an outcome of the game. The decision output by the at least one machine learning model may be transmitted, using a transceiver unit 214, to a screen/display 106. The referee, using his own judgment, can review the decision of the at least one machine learning model (or stated differently, the decision of the decision-making module 212/officiating system 102), and accept it or reject it. On a rejection of the decision from the at least one machine learning model, the decision is fed back to the at least one machine learning model as feedback for further finetuning. The finetuning may involve changing the weights, or even the criteria for a decision. In embodiments where the referee cannot override the decision of the officiating system 102, no feedback may be provided to the decision-making module 212.

In the drawings and specification, there have been disclosed exemplary embodiments of the invention. Although specific terms are employed, they are used in a generic and descriptive sense only and not for purposes of limitation. It will be apparent to those having ordinary skill in this art that various modifications and variations may be made to the embodiments disclosed herein, consistent with the present invention, without departing from the spirit and scope of the present invention. Other embodiments consistent with the present invention will become apparent from consideration of the specification and the practice of the description disclosed herein.

I claim:
1. A system, comprising:
 an image capturing unit, configured to capture a plurality of input images, the plurality of images depicting a two-dimensional representation of a playing field;
 an object detection module, configured to utilize computer vision techniques to detect a plurality of objects in the input images, the plurality of objects comprising at least two players, and a ball, using bounding boxes;

an object tracking module, configured to utilize computer vision techniques to track a change in the position of the plurality of objects across at least one input image, among the plurality of input images;

a simulation module, configured to:
- simulate a location of each object, among the plurality of objects, on the playing field, by using depth estimation on the plurality of input images, to render a three-dimensional representation of the playing field;
- identify x-axis, y-axis, and z-axis coordinates of the plurality of objects based on the depth estimation;
- divide a front wall of the playing field into a plurality of attacking sections;
- determine a relevant attacking section, among the plurality of attacking sections, based on the x-axis, y-axis, and z-axis coordinates of the ball;
- divide a floor of the playing field into a plurality of segments; and
- determine at least one relevant segment, among the plurality of segments, based on the x-axis, y-axis, and z-axis coordinates of the at least two players and/or the ball;

a metric module, configured to calculate at least one metric based on the coordinates of one or more objects, among the plurality of objects across the at least one input image; and a decision-making module, employing at least one artificial intelligence model, configured to render a decision based on:
- the at least one metric;
- the relevant attacking section;
- the at least one relevant segment; and
- one or more rules correlating the decision to the at least one metric, the relevant attacking section, and the at least one relevant segment.

2. The system as claimed in claim 1, wherein the plurality of input images are side-view images, and comprising:
an image processing unit configured to transform the plurality of input images to top-down perspective images using a perspective transformation technique.

3. The system as claimed in claim 2, wherein the at least one metric includes one or more of the following:
a distance between each player from the ball;
a reachability of each player;
a frontal interference and/or lateral interference;
a spatial shift of the objects; or
an angle of the ball between each player.

4. The system as claimed in claim 3, wherein the:
object detection module is configured to detect a playing tool associated with each player; and
metric module is configured to utilize the Euclidean distance formula to:
calculate the distance between each player and the distance between each player from the ball; and
calculate the reachability of each player, based on the distance between a head of each player's playing tool and the ball.

5. The system as claimed in claim 4, wherein the decision rendered by the decision-making module includes one of:
no let;
let; or
stroke.

6. The system as claimed in claim 5, wherein one player, among the at least two players, is a striker, and wherein the one or more rules for enabling the decision-making module to render a decision of no let is based on least one of:
the distance between the striker and the ball is greater than a threshold;
the distance between each player is lesser than a threshold; or
the distance between the striker, or a head of the striker's playing tool, and the ball is greater than the sum of the distance travelled by the striker, based on the spatial shift, and the striker's reach.

7. The system as claimed in claim 5, wherein the metric module is configured to determine if a player, among the at least two players, has a clear view of the front wall of the playing field, based on an amount of front wall blockage.

8. The system as claimed in claim 7, wherein one player, among the at least two players, is a striker, and wherein the rules for enabling the decision-making module to render a decision of let is based on least one of:
the distance between each player is lesser than a threshold;
the striker does not have a clear view of the front wall;
the angle of the ball is lesser than a threshold in at least one input image in a subset of the plurality of input images;
the distance between the striker, or a head of the striker's playing tool, and the ball is lesser than or equal to the sum of the distance travelled by the striker, based on the spatial shift, and the striker's reach; or
the frontal interference or the lateral interference to the striker is high.

9. The system as claimed in claim 5, wherein one player, among the at least two players, is a striker, and wherein the rules for enabling the decision-making module to render a decision of stroke is based on least one of:
the distance between the ball and the striker lesser than a threshold;
the distance between each player is lesser than a threshold;
the distance between the striker, or a head of the striker's playing tool, and the ball is lesser than or equal to the sum of the distance travelled by the striker, based on the spatial shift, and the striker's reach; or
the angle of the ball is nearly zero at least one input image in a subset of the plurality of input images.

10. The system as claimed in claim 3, wherein the metric module is configured to use the law of cosines to calculate the angle of the ball between each player.

11. The system as claimed in claim 1, wherein the artificial intelligence model includes at least one machine learning model that is trained on a plurality of videos, with each frame in each video labelled as one of no let, let, or stroke.

12. The system as claimed in claim 11, wherein the at least one machine learning model includes one of the following:
three binary classifiers;
a multiclass classification model; or
a neural network.

13. The system as claimed in claim 1, wherein the object detection module, employing a convolutional neural network, detects the at least two players in a single pass.

14. The system as claimed in claim 1, wherein the object detection module, employing a convolutional neural network, detects the ball using a Gaussian heat map centered on the ball.

15. A method, comprising:
  capturing, by an image capturing unit, a plurality of input images, the plurality of images depicting a two-dimensional representation of a playing field;
  detecting, by an object detection module utilizing computer vision techniques, a plurality of objects in the input images, the plurality of objects comprising at least two players and a ball, using bounding boxes;
  tracking, by an object tracking module, configured to utilize computer vision techniques to track a change in the position of the plurality of objects across at least one input image, among the plurality of input images;
  simulating, by a simulation module, a location of each object, among the plurality of objects, on the playing field, by using depth estimation on the plurality of input images, to render a three-dimensional representation of the playing field;
  identifying, by the simulation module, the x-axis, y-axis, and z-axis coordinates of the plurality of objects based on the depth estimation;
  dividing, by the simulation module, a front wall of the playing field into a plurality of attacking sections;
  determining, by the simulation module, a relevant attacking section, among the plurality of attacking sections, based on the x-axis, y-axis, and z-axis coordinates of the ball;
  dividing, by the simulation module, a floor of the playing field into a plurality of segments; and
  determining, by the simulation module, at least one relevant segment, among the plurality of segments, based on the x-axis, y-axis, and z-axis coordinates of the at least two players and/or the ball;
  calculating, by a metric module, at least one metric based on the coordinates of one or more of objects, among the plurality of objects across the at least one input image; and
  rendering, by a decision-making module employing at least one artificial intelligence model, a decision based on:
    the at least one metric;
    the relevant attacking section;
    the at least one relevant segment; and
    one or more rules correlating the decision to the at least one metric, the relevant attacking section, and the at least one relevant segment.

16. The method as claimed in claim 15, wherein the plurality of input images are side-view images, and the method comprises:
  transforming, by an image processing unit, the plurality of input images to top-down perspective images using a perspective transformation technique.

17. The method as claimed in claim 15, wherein the at least one metric includes one or more of the following:
  a distance between each player from the ball;
  a reachability of each player;
  a frontal interference and/or a lateral interference;
  a spatial shift of the objects; or
  an angle of the ball between each player.

18. The method as claimed in claim 17, comprising:
  detecting, by the object detection module, a playing tool associated with each player; and
  wherein the metric module utilizes the Euclidean distance formula to:
    calculate the distance between each player and the distance between each player from the ball; and
    calculate the reachability of each player, based on the distance between a head of each player's playing tool and the ball.

19. The method as claimed in claim 18, wherein the decision rendered by the decision-making module includes one of:
  no let;
  let; or
  stroke.

20. The method as claimed in claim 19, wherein one player, among the at least two players, is a striker, and wherein the one or more rules for enabling the decision-making module to render a decision of no let is based on least one of:
  the distance between the striker and the ball is greater than a threshold;
  the distance between each player is lesser than a threshold; or
  the distance between the striker, or a head of the striker's playing tool, and the ball is greater than the sum of the distance travelled by the striker, based on the spatial shift, and the striker's reach.

21. The method as claimed in claim 19, wherein the metric module is configured to determine if a player, among the at least two players, has a clear view of the front wall of the playing field, based on an amount of front wall blockage.

22. The method as claimed in claim 21, wherein one player, among the at least two players, is a striker, and wherein the rules for enabling the decision-making module to render a decision of let is based on least one of:
  the distance between each player is lesser than a threshold;
  the striker does not have a clear view of the front wall;
  the angle of the ball is lesser than a threshold in at least one input image in a subset of the plurality of input images;
  the distance between the striker, or a head of the striker's playing tool, and the ball is lesser than or equal to the sum of the distance travelled by the striker, based on the spatial shift, and the striker's reach; or
  the frontal interference or the lateral interference to the striker is high.

23. The method as claimed in claim 19, wherein one player, among the at least two players, is a striker, and wherein the rules for enabling the decision-making module to render a decision of stroke is based on least one of:
  the distance between the ball and the striker lesser than a threshold;
  the distance between each player is lesser than a threshold;
  the distance between the striker, or a head of the striker's playing tool, and the ball is lesser than or equal to the sum of the distance travelled by the striker, based on the spatial shift, and the striker's reach; or
  the angle of the ball is nearly zero at least one input image in a subset of the plurality of input images.

24. The method as claimed in claim 17, wherein the metric module is configured to use the law of cosines to calculate the angle of the ball between each player.

25. The method as claimed in claim 15, wherein the artificial intelligence model includes at least one machine learning model that is trained on a plurality of videos, with each frame in each video labelled as one of no-let, let, or stroke.

26. The method as claimed in claim 25, wherein the at least one machine learning model includes one of the following:

three binary classifiers;
a multiclass classification model; or
a neural network.

27. The method as claimed in claim 15, wherein the object detection module, employing a convolution neural network, detects the at least two players in a single pass.

28. The method as claimed in claim 15, wherein the object detection module, employing a convolutional neural network, detects the ball using a Gaussian heat map centered on the ball.

* * * * *